United States Patent [19]
Anderson et al.

[11] Patent Number: 5,560,195
[45] Date of Patent: Oct. 1, 1996

[54] GAS TURBINE INLET HEATING SYSTEM USING JET BLOWER

[75] Inventors: Rodger O. Anderson, Scotia; Julian D. Burrow, Ballston Lake; Christian L. Vandervort, Voorheesville, all of N.Y.

[73] Assignee: General Electric Co., Schenectady, N.Y.

[21] Appl. No.: 387,040

[22] Filed: Feb. 13, 1995

[51] Int. Cl.⁶ .................................................. F02C 7/04
[52] U.S. Cl. ........................ 60/39.07; 60/726; 417/80
[58] Field of Search ...................... 60/39.07, 39.093, 60/269, 726; 417/79, 80, 81, 83

[56] References Cited

U.S. PATENT DOCUMENTS 3,705,491  12/1972  Foster-Pegg ................. 60/39.55
4,182,117  1/1979   Exley et al. ................. 417/80
4,182,119  1/1980   Hurley ...................... 60/39.07

Primary Examiner—Louis J. Casaregola
Attorney, Agent, or Firm—Nixon & Vanderhye

[57] ABSTRACT

An inlet air heating system for a gas turbine comprising a main air inlet; ducting leading from the main inlet to an inlet of the gas turbine; a manifold located adjacent the inlet for feeding intermediate temperature air into the ducting; a conduit connected to the inlet air manifold, the conduit having an ambient air inlet and connected to a compressor bleed air conduit, downstream of the ambient air inlet; and one or more eductors in the conduit through which the bleed air flows to entrain the ambient air into the conduit through the ambient air inlet and to mix the bleed air and ambient air for introduction into the ducting through the manifold.

9 Claims, 3 Drawing Sheets

GAS TURBINE INLET HEATING SYSTEM USING JET BLOWER

TECHNICAL FIELD

This invention relates to gas turbines and more specifically, to a low pressure system for heating the air entering a gas turbine.

BACKGROUND PRIOR ART

In some atmospheric conditions, in order to achieve safe, efficient operation, air entering a gas turbine for power generation applications is required to be heated. In one current system, and with reference to FIG. 1 of the drawings, a gas turbine air inlet system 10 includes a main ambient air inlet 12, a filter house 14 and additional inlet ducting at 16, leading to a reduced outlet 18 connected to a gas turbine inlet (not shown). Heating air is introduced via a manifold 20 located in the inlet duct 16, downstream of one or more conventional silencers 22 and upstream of the gas turbine inlet. Hot air is bled from the gas turbine compressor (not shown) and carried via conduit 24 to the manifold 20, controlled by a pressure reducing valve 26.

As best seen in FIG. 1A, the manifold 20 includes a vertical riser 28 connected to the conduit 24, extending upwardly through the manifold. A plurality of horizontally oriented headers 30 (two of several shown) extend in opposite directions from the riser 28, and each includes a plurality of nozzles 32 which introduces the hot compressor-bled air into the duct 16 in a direction opposite the main flow of air entering at the inlet 12. This reverse flow entry of hot air from the compressor promotes good mixing of the hot bleed air with the ambient air flowing into the filter house 14 via inlet 12, towards the manifold 20.

The piping 28, 30 and the manifold 20 are typically stainless steel to prevent scale entering the gas turbine and causing damage. Because the manifold 20 is located near outlet 18 (and hence, the gas turbine inlet), however, mixing is less than ideal. This results in undesirable temperature gradients at the compressor inlet which are magnified at the compressor outlet. The manifold 20 is nevertheless positioned in the inlet duct, downstream of the filter house 14 and the silencer(s) 22 because the manifold is very noisy.

With reference now to FIG. 2, a second known system 34 is similar to the first described system but utilizes compressor bleed air which flows through a conduit 36 under the control of valve 38 and which is introduced through a manifold 40 located upstream of the inlet filter house 42 and adjacent the main inlet 44. The manifold 40 supports an array of silencing nozzles 42 (see FIG. 2A) to maintain an environmentally acceptable sound pressure level.

SUMMARY OF THE INVENTION

This invention utilizes one or more jet blowers or eductors to mix hot compressor bleed air with ambient air, and introduces the mixed (intermediate temperature) air upstream of the inlet filter house. This arrangement allows the inlet heating air to be efficiently mixed and provides the following benefits to the overall system:

(1) The invention provides better mixing of the hot compressor bleed air with the cool ambient air, giving a more even intermediate temperature distribution at entry to the sensitive gas turbine combustion system. This is generally beneficial but particularly so in dry low NOx systems. The even temperature distribution is achieved due to the efficient turbulent mixing in the jet blower, the evenly distributed manifold orifices, and the fact that mixing takes place the full length of the inlet ducting.

(2) Removing the heating manifold from within the inlet ducting reduces the inlet pressure loss, thereby reducing heat rate, increasing gas turbine power output and slightly decreasing exhaust temperature.

(3) Placing the heating manifold upstream of the inlet filter house allows the hot compressor bleed air to be used to de-ice all inlet components.

(4) The low pressure heating manifold, with compressor bleed air already reduced in temperature due to mixing at the jet blower, presents no hazard to personnel working in the inlet filter area. No additional safety screen is required.

(5) Taking the pressure drop across the one or more jet blowers negates the need for an array of expensive silencer nozzles on the heating manifold. Silencing of the relatively compact, remote and closed jet blower(s) could be easily accommodated if required.

(6) Placing the heating manifold upstream of the inlet filter house enables it to be made of lower cost carbon steel without fear of ingestion of rust flakes into the gas turbine.

(7) The invention permits a simple, low cost heating manifold and nozzle design.

Thus, in accordance with its broader aspects, the present invention relates to an inlet air heating system for a gas turbine comprising a main air inlet; ducting leading from the main air inlet to an inlet of the gas turbine; a manifold located adjacent the main air inlet for feeding intermediate temperature air into the ducting; a conduit connected to the manifold, the conduit having an ambient air inlet and connected to a compressor bleed air conduit, downstream of the ambient air inlet; and one or more eductors in the conduit through which the bleed air flows to entrain the ambient air into the conduit through the ambient air inlet and to mix the bleed air and ambient air for introduction into the ducting through the manifold.

Additional objects and advantages of the subject invention will become apparent from the detailed description which follows.

BRIEF DESCRIPTION OF THE DRAWINGS

FIG. 1A is an enlarged detail taken from A in FIG. 1;

BEST MODE FOR CARRYING OUT THE INVENTION

Figure 3:
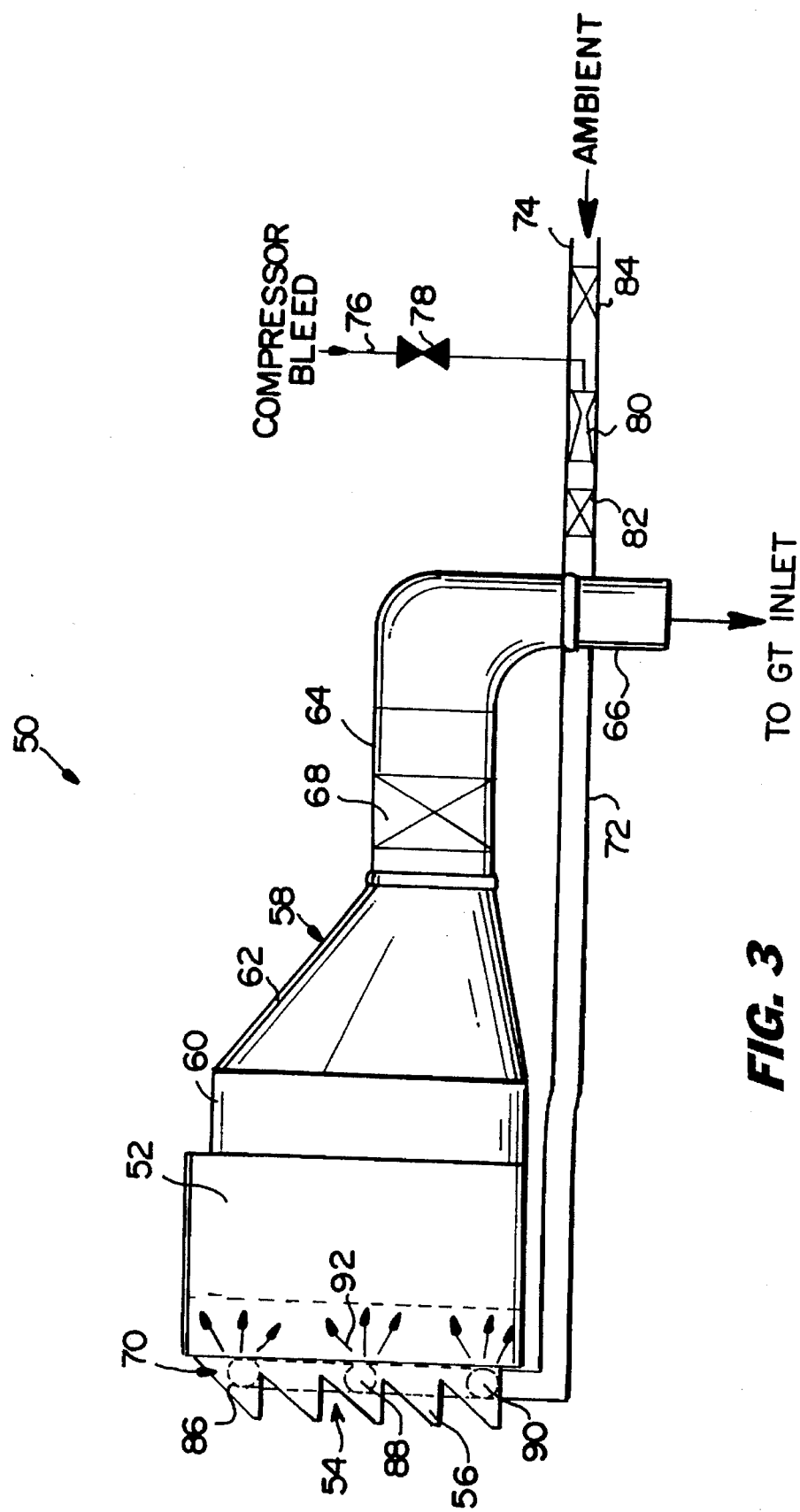
FIG. 3 is a simplified diagram of a gas turbine inlet heating system in accordance with this invention.

With reference now to FIG. 3, the low pressure (i.e., about 1 p.s.i.) gas turbine inlet system 50 in accordance with this invention includes a conventional filter house 52 adjacent the main heating system inlet 54. The inlet 54 includes a plurality of inlet hoods 56 as in the prior known constructions.

Figure 1:
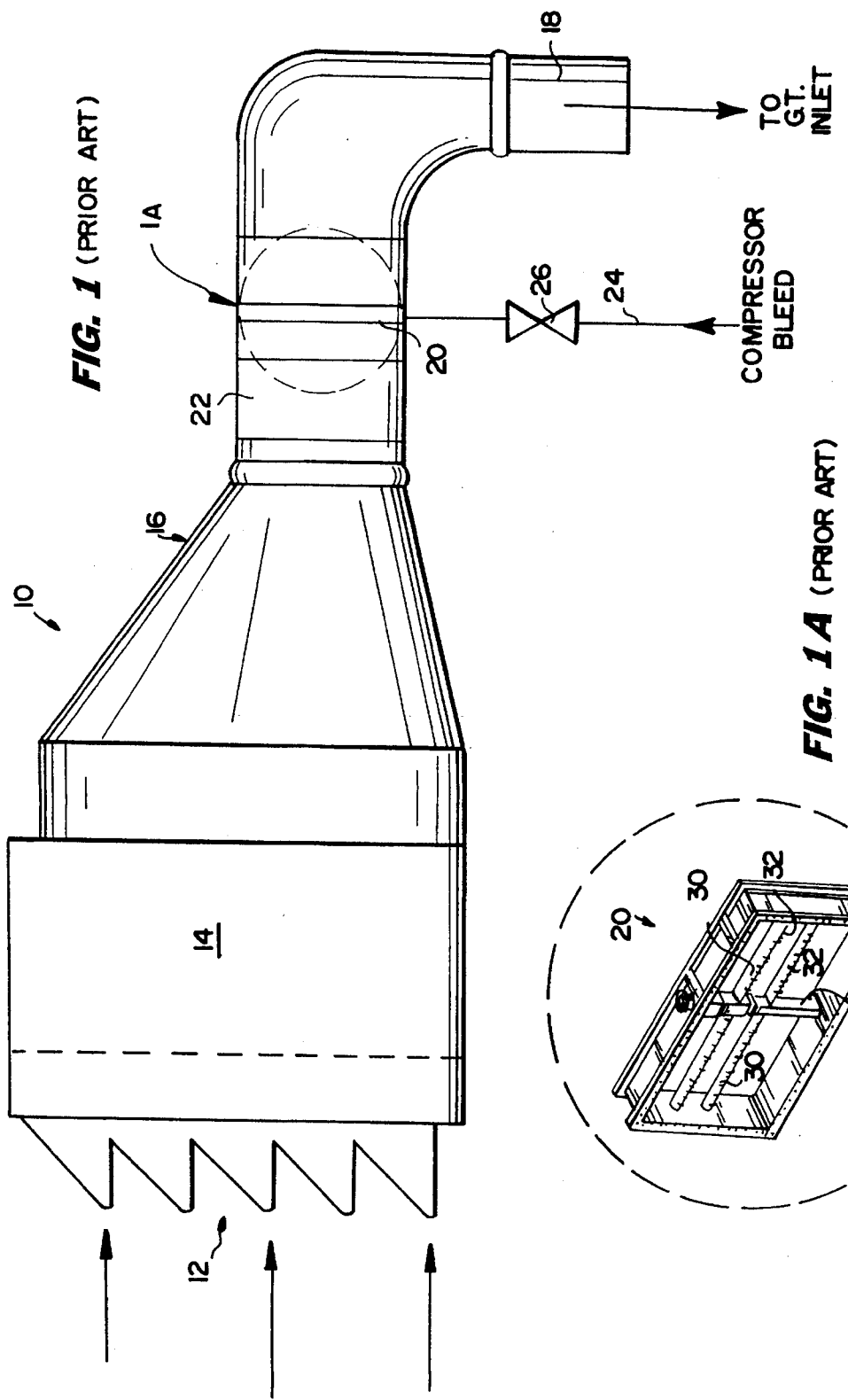
FIG. 1 is a simplified diagram illustrating a prior art inlet heating system for a gas turbine.
Figure 2:
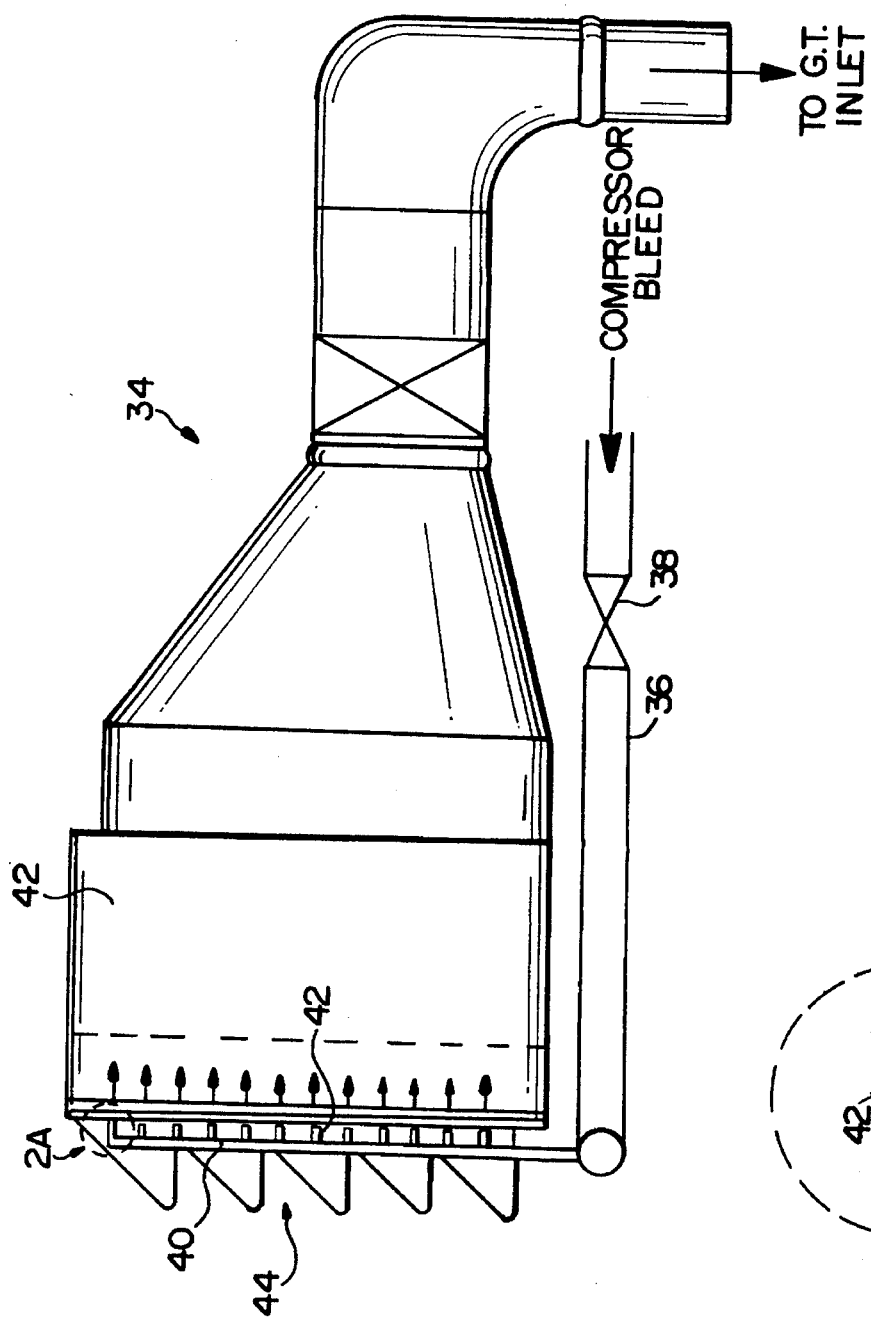
FIG. 2 is a simplified diagram of another prior art gas turbine inlet heating system.
Figure 2A:
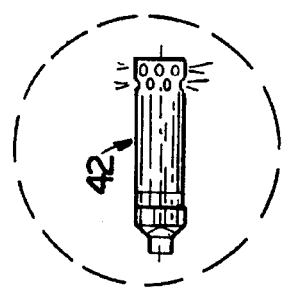
FIG. 2A is a partial perspective of a sonic nozzle used in the system shown in FIG. 2.

The filter house 52 connects to inlet ducting 58 which includes a large cross sectional area section 60, a tapered reducing section 62, and a smaller cross sectional area portion 64 leading to an outlet 66 connected to the gas turbine inlet (not shown). The inlet ducting section 64 incorporates a conventional silencer section 68. This arrangement is generally similar to that shown in FIGS. 1 and 2.

In accordance with this invention, however, a mixture of compressor bleed air and ambient air is supplied to a manifold 70 via a conduit 72. The conduit 72 has an inlet end at 74 where ambient air is introduced into the conduit. At the same time, bleed air from the gas turbine compressor (not shown) is introduced into the conduit 72 via conduit 76 and control valve 78. One or more otherwise conventional jet blowers or eductors 80 are located within the conduit 72, axially between a pair of silencers 82 and 84. It will be appreciated that the number and location of the eductor(s) 80 as well as the location of the eductors vis-a-vis the ducting outlet 66 and/or the inlet 54, may vary depending on the size of the gas turbine, related air flow requirements and other design considerations. For example, it may be necessary to utilize a pair of conduits (similar to conduit 72), each with its own eductor or jet blower, arranged to supply air to a common manifold (similar to manifold 70). Other arrangements utilizing additional eductors are also within the scope of this invention.

In the illustrated arrangement, the compressor bleed air, controlled by the valve 78, passes through the one or more eductors or jet blowers 80 which, in turn, entrain a large volume of cool ambient air through the inlet end 74 of conduit 72 and mix it with the hot bleed air from the compressor. This volume flow of intermediate temperature air is carded via conduit 72 to the low pressure manifold 70 upstream of the inlet filter house 52. The manifold 70 includes a plurality (three in the illustrated embodiment) of horizontal headers 86, 88 and 90, each of which is provided with a plurality of directional orifices (represented by flow arrows 92). It will be appreciated that the number of horizontal headers may change, depending on the size of the gas turbine. The mixed, intermediate temperature air exits the manifold 70 through the directional nozzle orifices which are oriented and sized to provide optimum distribution and mixing of the air from conduit 72 with the inlet flow stream entering the filter house 52 via inlet hoods 56 at the main inlet 54. Note that the heated air is introduced in the same direction as the air flow into the filter house 52.

In the above described embodiment, hot air from the compressor in the conduit 76 may be in the 700° F. range, while the air, after mixing, may be introduced into the filter housing 52 in an intermediate 200°–300° F. range for mixing with ambient air flowing into the filter house 52 at the inlet 54.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An inlet air heating system for a gas turbine comprising:

a main heating system air inlet;

ducting leading from the main heating system air inlet to an inlet of the gas turbine;

a manifold located adjacent the main heating system air inlet, said manifold having a plurality of nozzles;

a conduit connected to said manifold, said conduit having a separate ambient air inlet said conduit connected to a compressor bleed air conduit, downstream of the separate ambient air inlet; and one or more eductors in said conduit through which said bleed air flows to entrain said ambient air into said conduit through said separate ambient air inlet and to mix said bleed air and said ambient air for introduction into said ducting through said plurality of manifold nozzles at said main heating system air inlet.

2. The system of claim 1 wherein said manifold includes a plurality of headers, each having a plurality of said nozzles for directing said mixture of bleed air and ambient air into said ducting.

3. The system of claim 1 and including a filter house adjacent said main heating system inlet and downstream of said manifold.

4. The system of claim 1 wherein said conduit includes a silencer section downstream of said one or more eductors.

5. The system of claim 1 wherein said conduit includes a silencer section upstream of said one or more eductors.

6. The system of claim 1 wherein said conduit includes silencer sections located upstream and downstream of said one or more eductors.

7. The system of claim 1 wherein said ducting includes an outlet for connection to a gas turbine inlet and wherein said one or more eductors are located in proximity to said outlet.

8. The system of claim 1 wherein a control valve is located within said compressor bleed air conduit.

9. The system of claim 1 wherein said inlet includes a plurality of inlet air hoods, and further wherein said manifold is located proximate to said inlet air hoods.

* * * * *